J. R. ARMSTRONG.
GAS METER.
APPLICATION FILED NOV. 7, 1917.

1,283,025.

Patented Oct. 29, 1918.
3 SHEETS—SHEET 1.

WITNESSES
J. Herbert Bradley.
Lois Wineman.

INVENTOR
J. R. Armstrong
by W. G. Doolittle
Attorney

J. R. ARMSTRONG.
GAS METER.
APPLICATION FILED NOV. 7, 1917.

1,283,025.

Patented Oct. 29, 1918.
3 SHEETS—SHEET 2.

WITNESSES
J. Herbert Bradley.
Lois Wineman.

INVENTOR
J. R. Armstrong
by W. G. Doolittle
Attorney.

J. R. ARMSTRONG.
GAS METER.
APPLICATION FILED NOV. 7, 1917.
1,283,025.
Patented Oct. 29, 1918.
3 SHEETS—SHEET 3.
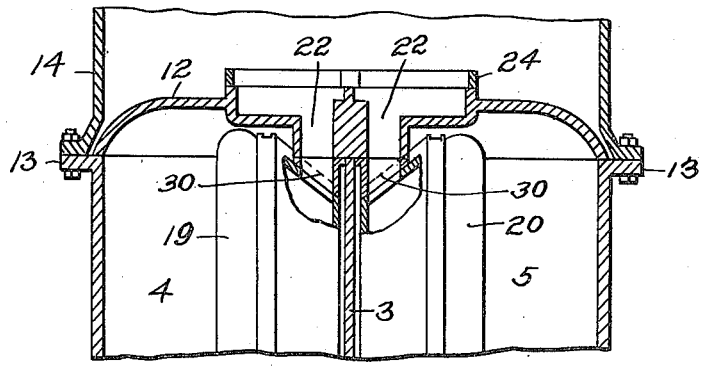
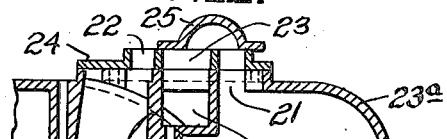
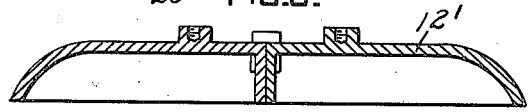
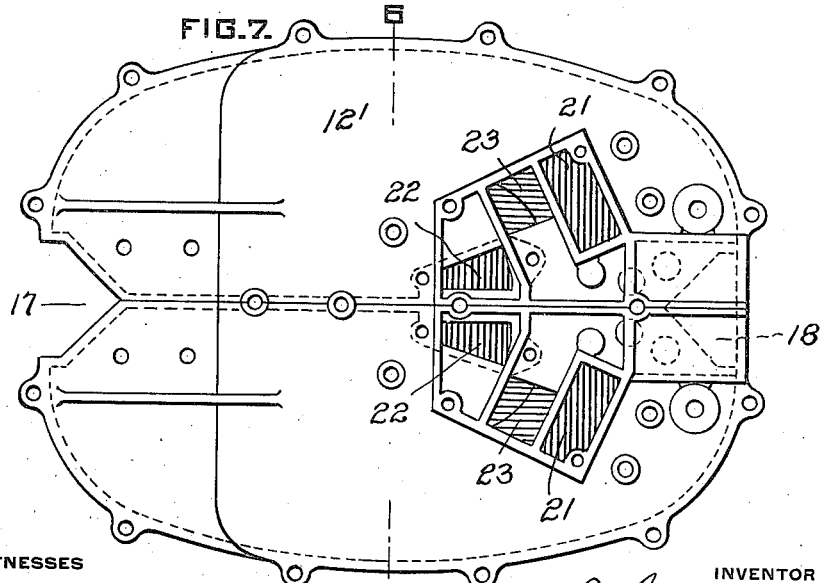
WITNESSES
J. Herbert Bradley.
Lois Vrieman.
INVENTOR
J. R. Armstrong
by W. G. Doolittle
Attorney.

UNITED STATES PATENT OFFICE.

JAMES R. ARMSTRONG, OF PITTSBURGH, PENNSYLVANIA, ASSIGNOR TO EQUITABLE METER COMPANY, OF PITTSBURGH, PENNSYLVANIA, A CORPORATION OF PENNSYLVANIA.

GAS-METER.

1,283,025.            Specification of Letters Patent.       Patented Oct. 29, 1918.

Application filed November 7, 1917. Serial No. 200,718.

*To all whom it may concern:*

Be it known that I, JAMES R. ARMSTRONG, a citizen of the United States, residing at Pittsburgh, in the county of Allegheny and State of Pennsylvania, have invented certain new and useful Improvements in Gas-Meters, of which the following is a specification.

My invention relates to fluid meters and particularly to gas meters of the type shown in a patent granted to me May 20th, 1913, Number 1,062,268.

Among the objects of the present invention are, to provide a new and improved meter of the class referred to in which the gas inlet and outlet ports or nozzles are formed in the main body of the meter or the meter casing; a main casing construction open at its top and of such a character that the top may be readily finished or ground, the entire upper end being on the same plane without projecting part or parts located below the said plane requiring finishing; a top-plate or closure body for said finished top having its under side free of projecting surfaces and formed with ports and adapted to carry the bellows, valves and valve actuating mechanism, said closure member being made either in one or two parts and designed to be applied to and removed from the casing together with the bellows, valves and actuating parts without affecting the connection between the gas supply and discharge and main casing; a main measuring chamber free of projecting parts to interfere with inserting the bellows structure therein and removing the same therefrom; and to provide new and improved means within the casing chamber for guiding, anchoring and draining the bellows structures.

In the accompanying drawings which illustrate applications of my invention,

Fig. 4 is a vertical sectional view taken on line 4—4 of Fig. 2;

Fig. 5 is a vertical sectional view taken on line 5—5 of Fig. 2;

Fig. 6 is a sectional view taken on line 6—6 of Fig. 7;

Fig. 7 is a top plan view of the closure member showing a two-part member;

Figure 1:
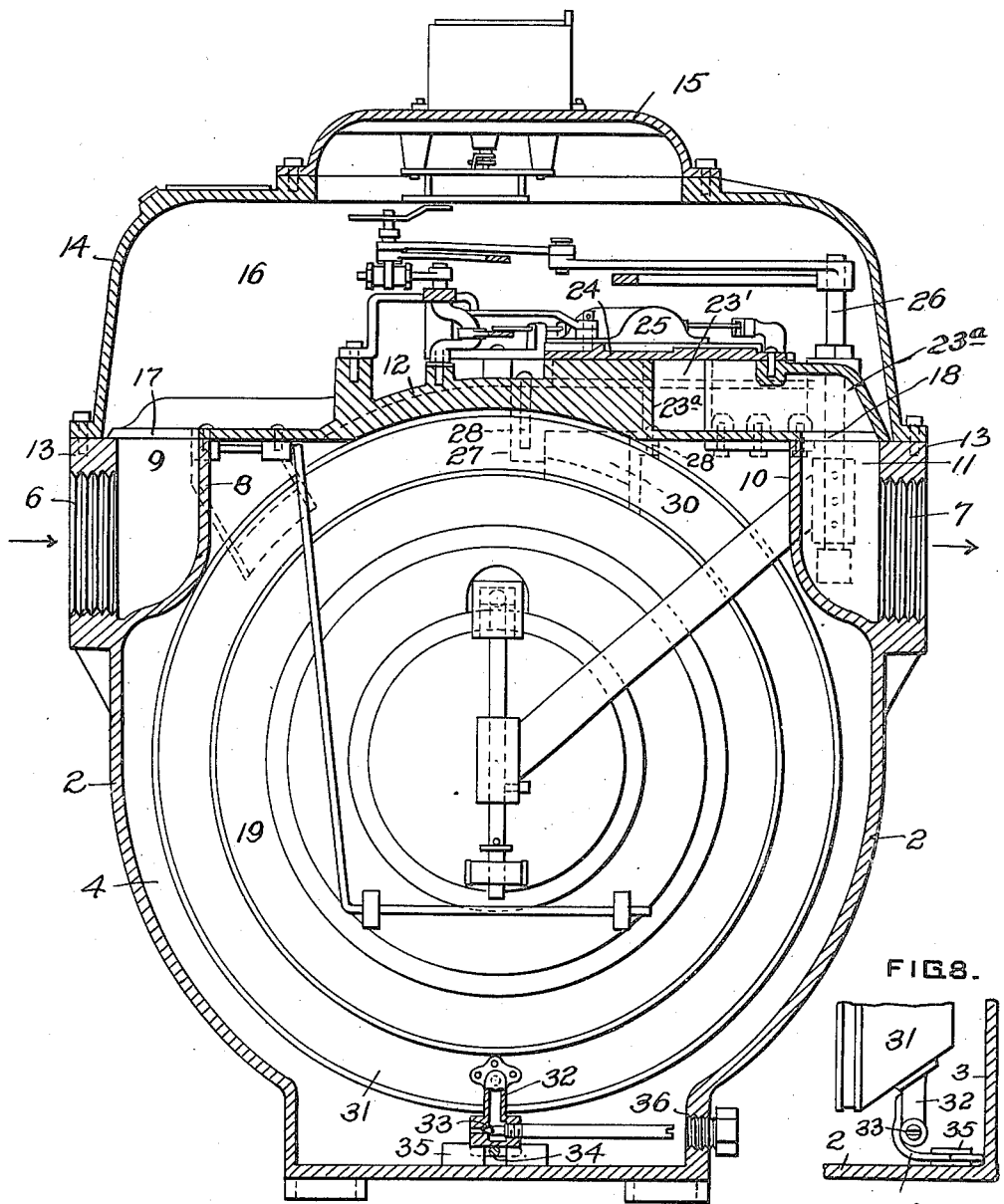
Figure 1 is a vertical sectional view of a meter embodying my invention.

In the embodiments of my invention as shown herein the meter is of the double or duplex bellows type, there being two pairs of measuring chambers with one chamber of each pair filling while the other two chambers are emptying. My present invention, however, is applicable to a meter having only one pair of measuring chambers.

In the drawings, 2 designates the main cast metal open-top casing having its interior divided by a centrally disposed partition 3 into two chambers 4 and 5. The casing is also formed with an inlet opening or nozzle 6 and an outlet opening or nozzle 7, said openings being arranged in line with each other and below the upper end of the casing. Adjacent the inlet nozzle the casing is formed interiorly thereof with walls 8, thereby forming an inlet passage 9 for the gas, and adjacent the outlet nozzle with walls 10 to form the gas discharge passage 11. The casing is an open-top one, its upper end being adapted to be closed by a closure structure 12, the latter being adapted to be secured to a flange 13 formed on the main casing and extending entirely around the top of the same.

It will be noted that the upper end of the casing including its seating flange 13 as well as the walls entering into the formation of the inlet and discharge passages are on the same plane, thereby permitting the same to be readily machined or finished to present the desired contacting surface for the closure member 12. Member 12 is free from projecting parts on its under surface and may also be readily finished to present a desirable contact surface with the engaging surface of the casing.

In addition to the closure or cap-plate 12, I provide an upper hood or cover 14, cover 14 also being secured to the flange of the main casing. Cover 14 is provided with a centrally disposed opening in its upper portion designed to be covered by a cap 15.

It will be noted that the construction just described forms a chamber 16 between the cap-plate 12 and the hood or cover 14, and that the cap-plate is provided with recesses 17 and 18 respectively adapted to register with the gas inlet and outlet passages.

The arrangement is such that the cap-plate 12 carries practically all of the operating mechanism, including the bellows structures 19 and 20, constituting the supplemental measuring chambers, and respectively located in measuring chambers 4 and 5. Cap-plate 12 is formed with two sets of ports, one set for each pair of measuring chambers. Each set includes two inlet ports 21 and 22 which establish communication between the space inclosed by hood or cover 14 and the measuring chambers 4 and 5. Port 21 communicates with the main measuring chamber 4 (or chamber 5) and port 22 with the bellows or supplemental chamber 19 (or 20).

Located between the inlet ports 21 and 22 is the outlet port 23 which is in communication with the outlet gas discharge passage 11 by means of passage 23' formed in the plate and located outside of the chambers 4 or 5. From the drawings it will be seen that passage or duct 23' is provided by projecting a wall 23ª upwardly from the seating surface of the cap-plate, thereby providing said passage or passages 23' entirely within the cap-plate. The three ports 21, 22 and 23 open through a valve seat 24, which latter is adapted to receive the D-shaped slide valve 25.

The connections between the respective bellows structure and the flag rods 26 as well as the mechanism for transmitting motion from the flag rods to the valves forms no part of the present invention, and hence I deem it unnecessary to describe the same herein, very similar mechanism being shown and described in my above mentioned patent and in Letters Patent issued to me May 9, 1911, Number 991,927.

The bellows structures 19 and 20 are secured to the cap-plate 12 by means of brackets 27, and screws 28, and each is provided with a neck 30, the latter registering with the port 22 of the cap-plate whereby gas is passed to the interior of the bellows.

Figure 8:
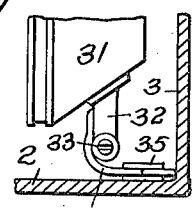
Fig. 8 is a detail side elevational view of anchor and guide means for a bellows structure.
Figure 9:
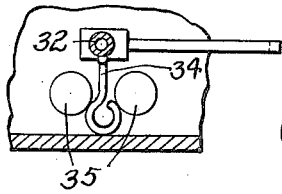
Fig. 9 is a part plan and a part sectional view of the structure shown in Fig. 8.
Figure 2:
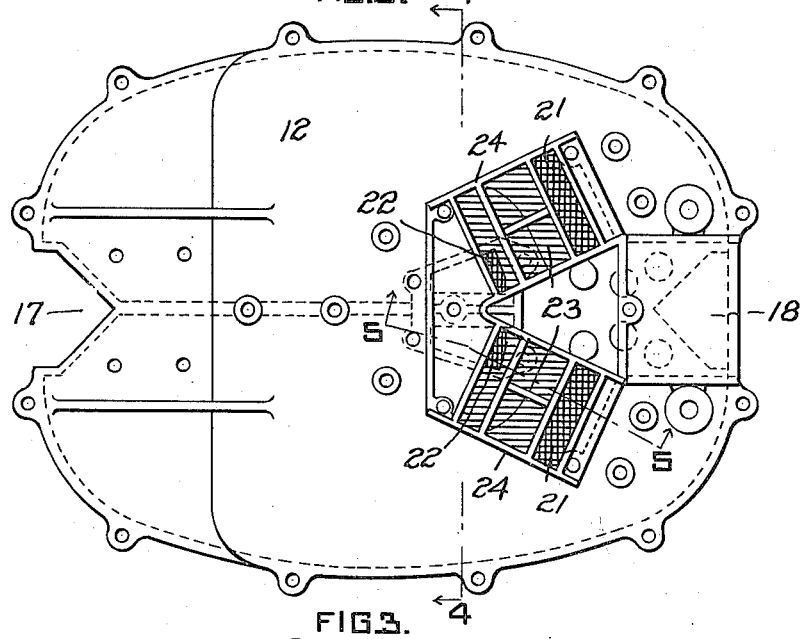
Fig. 2 is a top plan of the closure member.
Figure 3:
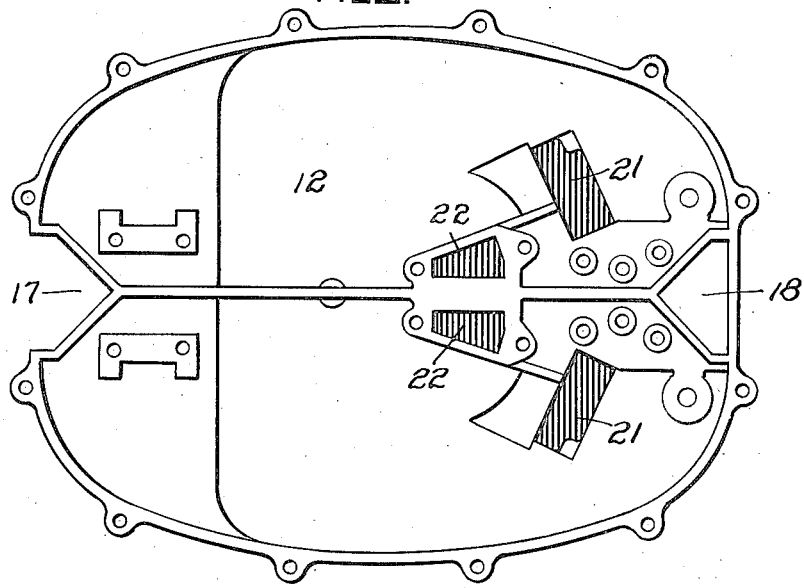
Fig. 3 is a bottom view of said member.

As particularly shown at the lower portion of Fig. 1 and the detail views Figs. 8 and 9, I provide means for properly positioning the bellows structures within the respective chambers of the main casing and draining the same. As illustrated, the pan portion 31 of each bellows structure has secured thereto a downwardly projecting tubular T-shaped member 32 carrying a needle valve 33 and a guide and anchoring member 34. Member 34 is adapted to be entered between two lugs or engaging members 35 formed on or secured to the interior of the casing chambers. For the purpose of permitting access to the valves 33 and for removing the accumulated liquid from the chambers, I provide the casing with holes 36.

It will be understood that the meter may be readily assembled and that the bellows structures together with the valves, etc., may be placed in position and removed from the main casing by lowering and raising the cap-plate and that the chambers 4 and 5 are free from any projecting parts that would interfere with the removal of or placing the bellows in position, and by the employment of the guide and drainage means shown, the desired positioning of the bellows within the chambers and the draining of the same are readily effected.

It may sometimes be desirable to provide a divided cap-plate or a separate cap-plate for each of the measuring chambers 4 and 5 and in Fig. 7, I have shown such a construction and have designated the cap-plate 12'. When this form of cap-plate is employed, it will be understood that one bellows structure is secured to one plate and the other bellows to the second plate.

What I claim is:—

1. In a gas meter, the combination with an open-top casing formed with gas inlet and discharge openings and having interiorly disposed walls adjacent said openings entering into the formation of passages for gas with the upper edges of said walls disposed in the same plane as the upper end of the casing, and a ported cap-plate seated upon the casing and said walls, said openings being located below the cap-plate.

2. In a gas meter, the combination with an open-top casing formed with alined gas inlet and discharge openings adjacent the open top and having interiorly disposed walls adjacent said openings entering into the formation of passages for gas with the upper edges of said walls disposed in the same plane as the upper end of the casing, and a ported cap-plate seated upon the casing and said walls, said openings being located below the cap-plate.

3. In a gas meter, the combination with an open-top casing having a seating flange at its upper end and formed with gas inlet and discharge openings below said flange, a ported cap-plate seated upon said flange, a hood above the cap-plate also seated on the flange, a chamber below the cap plate, a bellows structure in said chamber, and means controlling communication between the hood and the chamber and bellows.

4. In a gas meter, the combination with an open-top casing having a seating flange at its upper end and formed with gas inlet and discharge openings below said flange, a ported cap-plate seated upon said flange, a hood above the cap-plate also seated on the flange, said casing having interiorly disposed walls adjacent said openings entering into the formation of passages for gas, a chamber below the cap plate, a bellows structure in said chamber, and means controlling communication between the hood and the chamber and bellows.

5. In a gas meter, the combination with an open-top casing formed with gas inlet and discharge openings below its open top, a ported cap-plate fitted to the casing above the said openings, a main chamber below the cap-plate, a bellows structure secured to the cap-plate and disposed within the main chamber, a hood above the cap-plate, a valve on the cap-plate controlling communication between the hood and the main chamber and bellows structure, and valve actuating means on the cap-plate operatively connected with the bellows structure.

6. In a gas meter, the combination with an open-top casing having a seating flange at its upper end and formed with gas inlet and discharge openings below the flange, a ported cap-plate seated on the flange, a main chamber below the cap-plate, a bellows structure secured to the cap-plate, and disposed within the main chamber, a hood above the cap-plate also seated on the flange, a valve on the cap-plate controlling communication between the hood and the main chamber and bellows structure, and valve actuating means on the cap plate operatively connected with the bellows structure.

7. In a gas meter, the combination with an open-top casing formed with a gas discharge opening below its upper end and having an interiorly disposed wall adjacent said opening entering into the formation of a gas discharge passage, a ported cap-plate seated on the casing and having a recessed portion registering with the gas discharge passage and a duct within the cap-plate forming communication between the discharge ports of the cap-plate and the gas discharge passage.

8. In a gas meter, the combination with a casing partitioned to form two open-top chambers, independent cap plates for closing said chambers each having a gas discharge port, a bellows structure secured to each plate, said casing having gas inlet and outlet openings disposed below the cap plates, a gas discharge passage, and a duct within the cap-plate forming communication between the discharge ports of the cap-plates and the gas discharge passage.

9. In a gas meter, the combination with an open-top casing having its interior lower portion provided with engaging means, a ported cap-plate seated on the upper end of the casing, a bellows structure secured to the cap-plate, said bellows structure provided with means adapted to coact with the engaging means of the casing for positioning the bellows within the casing.

10. In a gas meter, the combination with an open-top casing having its interior lower portion provided with engaging means, a ported cap-plate seated on the upper end of the casing, a bellows structure secured to the cap-plate, said bellows structure provided with means adapted to coact with the engaging means of the casing for positioning the bellows within the casing, said means on the bellows structure including a tubular member in communication with the interior of the bellows.

11. In a gas meter, the combination with an open-top casing having its interior lower portion provided with engaging means, a ported cap-plate seated on the upper end of the casing, a bellows structure secured to the cap-plate, said bellows structure provided with means adapted to coact with the engaging means of the casing for positioning the bellows within the casing, said means including a valve-controlled tubular member in communication with the interior of the bellows.

In testimony whereof I affix my signature in presence of two witnesses.

JAMES R. ARMSTRONG.

Witnesses:
 J. M. GEOGHEGAN,
 LOIS WINEMAN.